United States Patent [19]

Björklund et al.

[11] Patent Number: 5,627,735
[45] Date of Patent: May 6, 1997

[54] METHOD AND DEVICE FOR COMPENSATION OF UNBALANCE IN A SERIES COMPENSATED CONVERTER STATION

[75] Inventors: Per-Erik Björklund, Bjursås; Tomas Jonsson, Grängesberg; Lars-Erik Juhlin, Ludvika, all of Sweden

[73] Assignee: Asea Brown Boveri AB, Vasteras, Sweden

[21] Appl. No.: 558,083

[22] Filed: Nov. 13, 1995

[30] Foreign Application Priority Data

Nov. 15, 1994 [SE] Sweden .................................. 9403924

[51] Int. Cl.$^6$ ........................................................ H02J 3/36
[52] U.S. Cl. ............................................................ 363/35
[58] Field of Search ............................ 363/51, 35, 40–44, 363/84–89, 95–96, 98, 129–132, 137, 34–37, 39

[56] References Cited

U.S. PATENT DOCUMENTS

| | | | |
|---|---|---|---|
| 4,434,376 | 2/1984 | Hingorani | 207/102 |
| 5,138,544 | 8/1992 | Jessee | 363/43 |
| 5,168,437 | 12/1992 | Gyugyi et al. | 363/42 |
| 5,267,137 | 11/1993 | Goebel | 363/87 |
| 5,311,418 | 5/1994 | Lalander | 363/27 |
| 5,337,227 | 8/1994 | Stacey et al. | 363/71 |
| 5,406,470 | 4/1995 | Ridley et al. | 363/69 |
| 5,414,612 | 5/1995 | Björklund et al. | 363/35 |
| 5,446,643 | 8/1995 | McMurray | 363/40 |
| 5,499,178 | 3/1996 | Mohan | 363/39 |

FOREIGN PATENT DOCUMENTS

WO94/07291  3/1994  WIPO.

OTHER PUBLICATIONS

Uhlmann, Power Transmission by Direct Current, Springer-Verlag Berlin Heidelberg New York 1975, pp. 124–133.

Reeve et al., A Technical Assessment of Artificial Communication of HVDC Converters With Series Capacitors, IEEE Transactions on Power Apparatus and Systems, vol. PAS-87, No. 10, Oct. 1968, pp. 1830–1840.

*Primary Examiner*—Aditya Krishnan
*Attorney, Agent, or Firm*—Pollock, Vande Sande & Priddy

[57] ABSTRACT

A series-compensated converter station included in an installation for transmission of high-voltage direct current comprises a converter (SR1, SR2) with at least one 6-pulse bridge (BR). Via series capacitors (SCR, SCS, SCT) the 6-pulse bridge is connected to a three-phase alternating-voltage network (N1, N2) with a fundamental frequency ($f_{o1}$, $f_{o2}$). Control equipment (CE1, CE2) generates an ordered value (AOL) of a control angle ($\alpha$) for valves (V1–V6) included in the 6-pulse bridge in dependence on a limiting signal (AMAXL) capable of being influenced. An amplitude signal (AMPL) is formed which corresponds to the amplitude ($C_1$) for a component ($C_1\cos(2\pi f_0 t+\phi_1)$) of the fundamental frequency in the direct voltage (Udb) of the 6-pulse bridge and a compensating signal (ACOMP) is continuously calculated in dependence on a sensed voltage (Un1, Un2) at the converter station and on the amplitude signal. The limiting signal is formed in dependence on the compensating signal for the purpose of maintaining the commutating margin ($\gamma_m$) for the valves equal to at least the preselected value ($\gamma_p$) in case of unbalance between the voltages (UCR, UCS, UCT) of the series capacitors. (FIG. 6)

12 Claims, 11 Drawing Sheets

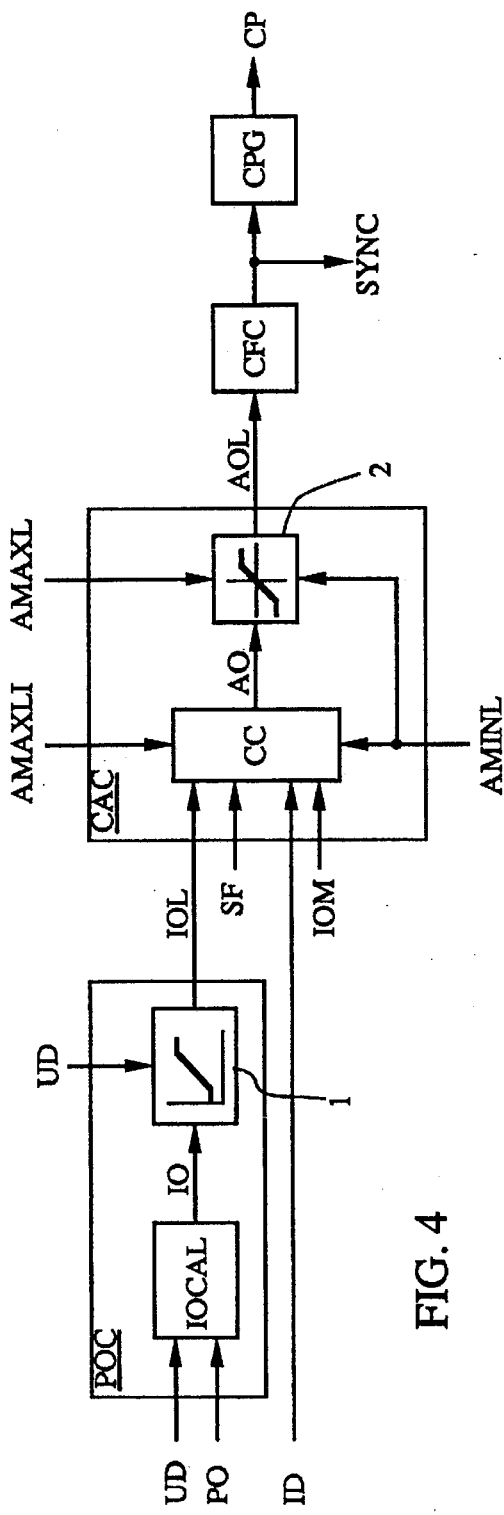
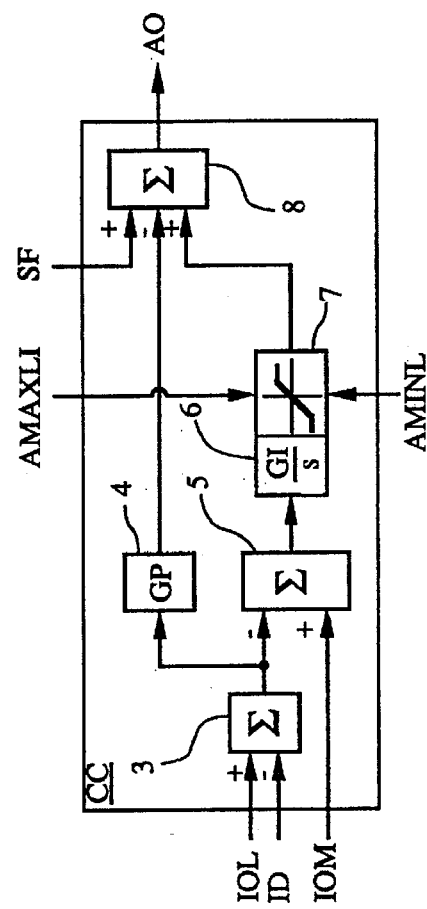
FIG. 4
FIG. 5

METHOD AND DEVICE FOR COMPENSATION OF UNBALANCE IN A SERIES COMPENSATED CONVERTER STATION

TECHNICAL FIELD

The present invention relates to a method for control of a series-compensated converter station, included in an installation for transmission of high-voltage direct current, and to a device for carrying out the method.

By a series-compensated converter station is meant, in this connection, a converter station, the converter bridges of which are connected to an alternating-voltage network via series capacitors, possibly with an intermediate transformer.

BACKGROUND OF THE INVENTION

An installation for transmission of high-voltage direct current between two alternating-voltage networks comprises two converter stations, each connected on its a.c. side to a separate one of the alternating-voltage networks, and a common d.c. connection. The d.c. connection may be in the form of an overhead line and/or cable and may also in certain parts consist of ground or water instead of a metallic conductor. Each of the converter stations comprises a converter, series capacitors, usually at least one converter transformer, as well as shunt filters for generation of reactive power and filtering of harmonics. The converters are normally line-commutated, current-source converters, by which it is to be understood that the current commutation between the valves of the converters takes place by means of voltages occurring in the alternating-voltage network, and that the d.c. connection, viewed from the converters, occurs as a stiff current source.

For the purpose of reducing the harmonics generated by the converters, especially the 5th and 7th harmonics, each of the converters usually consists of two mutually series-connected six-pulse bridges, the converter transformer being provided with two secondary windings with a mutual phase shift of 30°. Each of the converter bridges is connected to the alternating-voltage network via series capacitors and a separate secondary winding on the converter transformer.

During normal operation, one of the converters, hereinafter referred to as the rectifier, operates in rectifier operation, and the other, hereinafter referred to as the inverter, operates in inverter operation. Control equipment for the respective converter generates a control signal corresponding to a control angle $\alpha$ at which firing pulses are applied to the valves of the converters.

For the purpose of minimizing the consumption of reactive power by the converters, and reducing the stresses on components included in the converter stations, it is advantageous to control the rectifier with the smallest possible control angle $\alpha$ and to control the inverter with a control angle which results in the smallest possible extinction angle $\gamma$ (margin of commutation) without jeopardizing the controlled operation. The control system of the installation is, therefore, usually designed such that the inverter is controlled to a suitable maximum direct voltage for the operating conditions of the installation, taking into consideration safety margins with respect to commutating errors, voltage variations on the a.c. network, and other deviations from nominal operation which may occur whereas the rectifier is controlled by current control. The reference value of the current control is formed in dependence on a current order, which in turn is formed in dependence on a power order and the prevailing direct voltage in such a way that the direct current and hence the transferred active power remain at a desired value.

Usually, the control equipment for rectifiers and inverters is designed identically, whereby in the rectifier a current controller is activated and in the inverter control equipment for a control with the aim of maintaining the extinction angle at, but not lower than, a preselected lowest value is activated. Between the control angle $\alpha$, the extinction angle $\gamma$, and the overlap angle u, the known relationship $\alpha+u+\gamma=180°$ prevails. The control equipment of the inverter is usually designed such that its control angle is formed in dependence on a limiting signal. Such a limiting signal may, in turn, be formed in dependence on sensed values of direct current and available commutating voltage, in dependence on predicted values of the extinction angle, or by means of a feedback control of the extinction angle.

The control system of the converters is usually designed to generate firing pulses to the respective valves with mutually identical intervals, so-called equidistant control.

With series compensation, several advantages are obtained. The series capacitors are charged periodically by the current which flows through them and the voltage across the capacitors thus generated provide an addition to the commutating voltage across the valves of the converter. The commutating voltage becomes phase-shifted relative to the voltages of the alternating-voltage network in such a way that, with control and extinction angles still related to the phase position for the voltages of the alternating-voltage network, the valves in rectifier operation may be controlled with control angles smaller than zero and in inverter operation with extinction angles smaller than zero (although the commutating margin, related to the commutating voltage of the valve, is, of course, greater than zero). This makes possible a reduction of the reactive power consumption for the converters. In this way, the need of generation of reactive power in the shunt filters is reduced, and the shunt filters may thus be dimensioned substantially on the basis of the need of harmonic filtering.

The charging current of the capacitors and hence the voltage thereof are proportional to the direct current in the d.c. connection, and by suitable dimensioning of the capacitors, the dependence of the overlap angle on the magnitude of the direct current may be compensated for. This means that the series compensation contributes to maintaining the commutating margin of the valves also in case of fast current transients. The control of the inverter means that the inverter, at least without series compensation, exhibits a negative current/voltage characteristic, which, especially in those cases where the d.c. connection comprises a long cable, in case of voltage reductions in the alternating-voltage network may lead to an avalanche-like growth of the current. The series compensation influences the current/voltage characteristic of the inverter in a stabilizing direction, and by a suitable choice of series capacitors it may also be brought to be positive.

For a general description of the technique for transmission of high-voltage direct current, reference is made to Erich Uhlmann: Power Transmission by Direct Current, Springer Verlag, Berlin Heidelberg New York 1975.

A general description of the mode of operation of the converter station with series capacitors introduced into the ac connections between the converter transformer and a converter in a six-pulse bridge connection is given in John Reeve, John A. Baron, and G. A. Hanley: A Technical Assessment of Artificial Commutation of HVDC Converters with Series Compensation (IEEE Trans. on Power Apparatus and Systems, Vol. PAS-87, October 1968, pages 1830–1840).

However, series compensation of the converter station means that the commutating voltage of the valves is dependent on both amplitude and phase for the current-dependent voltage across the respective series capacitor. During stationary undisturbed operation with symmetrical phase currents, the mean value of the voltage across the respective capacitor remains equal to zero and the capacitor voltages are identical between themselves. Their contribution to the commutating voltage thus remains equal for all the valves included in the converter bridge. In case of fast changes in direct current and/or control angle for the converter bridges, however, capacitors in different phases will be charged with a different current-time area and hence assume different voltages. An unbalance in capacitor voltage and hence in commutating voltage thus arises between the different phases.

When the operating state returns to stationary undisturbed operation, the unbalance is reduced by itself in that it entails different overlap angles and conduction intervals for different valves. This process, however, occurs relatively slowly, especially during operation with low current and may typically take several seconds.

The unbalance also means that the voltage across the direct-voltage terminals of the converter bridges will contain an alternating-voltage component of the same frequency as the fundamental-tone frequency of the connected alternating-voltage network, usually 50 or 60 Hz. A method and a device for damping oscillations in a power transmission system at or near fundamental frequency are described in the patent specification WO 94/07291.

However, an unbalance in the capacitor voltages also means that the commutating margin is reduced for certain valves in the converter bridge, which in turn entails an increased risk of commutating errors. This increased risk remains, although to a decreasing extent, also during the time the unbalance is reduced.

SUMMARY OF THE INVENTION

The object of the invention is to provide a method of the kind described in the introduction, which, in case of unbalances occurring in the capacitor voltages, influences the ordered control angle such that a commutating margin is obtained which is not lower than that which is aimed at, and a device for carrying out the method.

What characterizes a method and a device according to the invention will become clear from the appended claims.

Advantageous improvements of the invention will become clear from the following description and claims.

By means of the invention, the advantages of the series compensation are utilized without the risk of commutating errors increasing in connection with transients in direct current and/or control angle. For the inverter this is of importance since the aim of its control equipment during normal operation is that the commutating margin should remain at but not be below a preselected lowest value. For the rectifier, this is important above all in case of rapid control angle changes, for example during such fault conditions in the dc connection where the rectifier is to be rapidly controlled towards the greatest possible negative voltage, which is achieved by ordering the control angle to a value near 180°. Such control angle changes means, on the one hand, that the risk of unbalance of the kind mentioned increases and, on the other hand, that the rectifier will operate near its commutating margin.

BRIEF DESCRIPTION OF THE DRAWINGS

The invention will be explained in greater detail by description of embodiments with reference to the accompanying drawings, wherein FIG. 1 schematically shows an installation for transmission of high-voltage direct current with series-compensated converter stations, FIG. 4 shows in the form of a block diagram parts of control equipment for the converter stations according to FIG. 1, in one embodiment of the invention, FIG. 5 shows in the form of a block diagram an embodiment of a current controller for control equipment according to FIG. 4.

DESCRIPTION OF THE PREFERRED EMBODIMENTS

The following description relates both to the method and to the device, and the figures can thus be regarded both as signal flow diagrams and block diagrams of devices. The expressions "calculating value", "(calculated) value" and "signal" are therefore used synonymously.

It is assumed in the following that the control angle $\alpha$, the angle when commutation is started, and the extinction angle $\gamma$, the angle when commutation is terminated, are related to the voltages of the respective alternating-voltage network in a conventional manner. By commutating margin $\gamma m$ is meant the extinction angle related to the commutating voltage across a valve in a converter bridge. For a non-series-compensated converter station, the extinction angle $\gamma$ is thus equal to the commutating margin $\gamma m$, whereas for a series-compensated converter station the extinction angle $\gamma$ generally deviates from the commutating margin $\gamma m$ and may also assume values less than zero.

Figure 1:
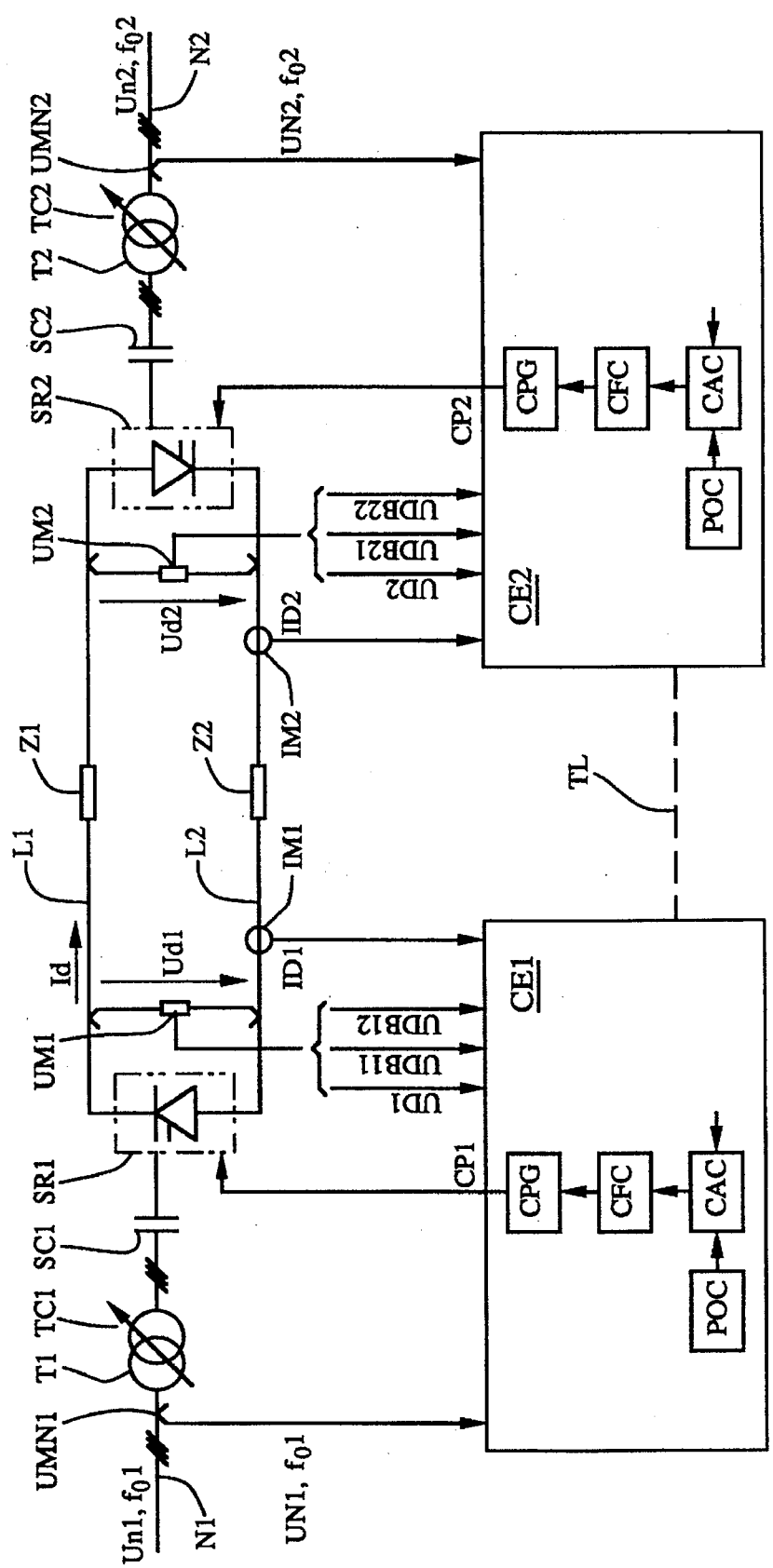

FIG. 1 shows an installation for transmission of high-voltage direct current between two three-phase alternating-voltage network N1 and N2, only roughly indicated. Each one of the alternating-voltage networks has a fundamental frequency $f_{o1}$ and $f_{o2}$, respectively, usually 50 or 60 Hz.

A converter SR1 is connected with its alternating-voltage terminals to the network N1 via series capacitors SC1 and a transformer T1 and a converter SR2 is connected with its alternating-voltage terminals to the network N2 via series capacitors SC2 and a transformer T2. Each one of the transformers is equipped with a tap-changer TC1, TC2, respectively, marked with an arrow in the figure. A d.c. connection L1, L2 connects the direct-voltage terminals of the converter SR1 to the corresponding direct-voltage terminals on the converter SR2. The impedances of the d.c. connection are designated Z1, Z2, respectively. Further, shunt filters (not shown in the figure) for generation of reactive power and filtering of harmonics are connected to the respective alternating-voltage network.

For the description of the embodiment it is assumed that the converter SR1 operates as a rectifier and the converter SR2 operates as an inverter, but both converters are adapted to be able to operate in a known manner both as rectifiers and inverters.

Figure 2:
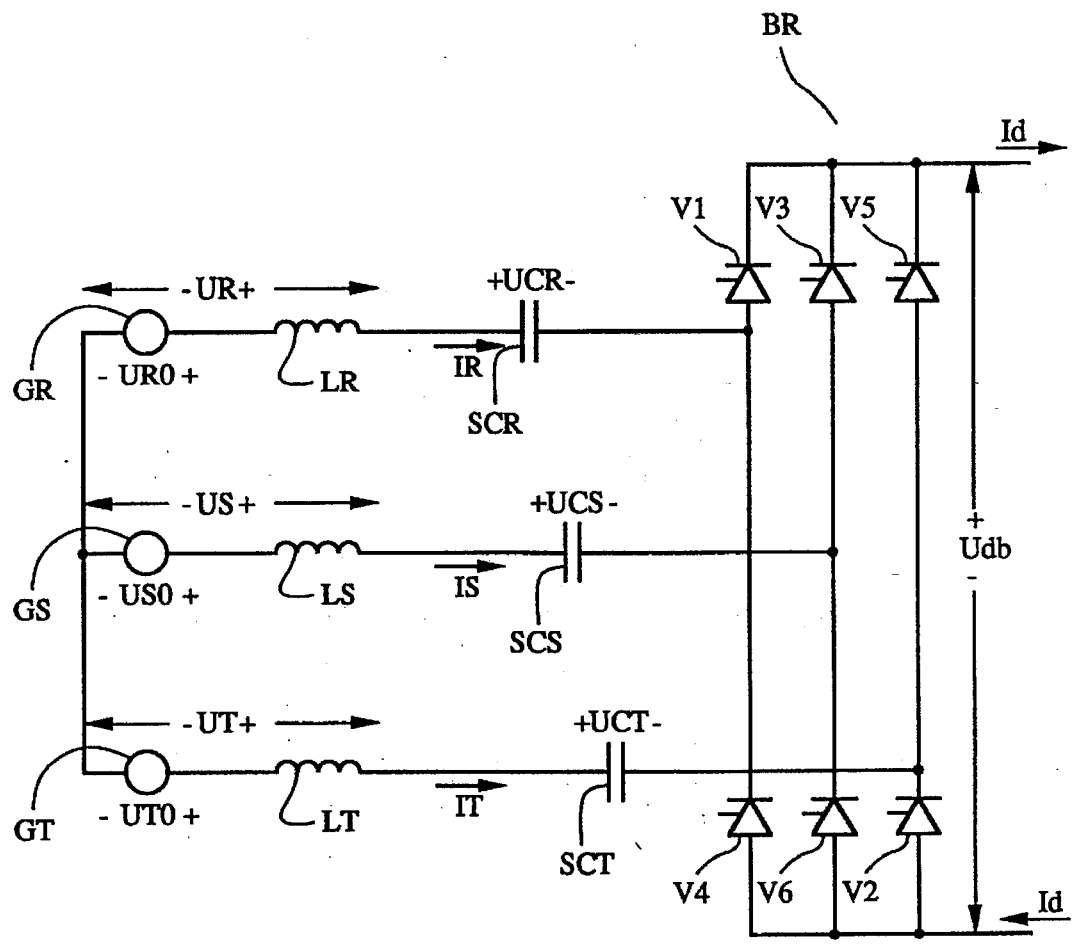
FIG. 2 shows a converter bridge connected via series capacitors to a three-phase alternating-voltage network.

The converters may be designed in a known manner as two series-connected 6-pulse bridges to form a 12-pulse connection, whereby each of the transformers comprises two secondary windings with a mutual phase shift of 30°, for example one secondary winding in Y connection and one secondary winding in Δ connection. FIG. 2 shows a six-pulse bridge BR, comprising six mutually identical valves V1–V6, shown as thyristors in the figure, connected on the alternating-voltage side via series capacitors SCR, SCS, SCT to a three-phase network comprising three voltage generators GR, GS, GT in series connection with three inductors LR, LS, LT, respectively, which network constitutes an equivalent circuit for the above-mentioned transformer, shunt filter and alternating-voltage network. The direct voltage across the 6-pulse bridge is designated Udb.

The commutating voltage for a valve is designated UKVm,n, where index m indicates a decommutating and index n a commutating valve. During commutation from the valve V1 to the valve V3, during which process also the valve V2 carries the current, the commutating voltage is UKV1,3=US−UCS−UR+UCRT. At a transient delay of the time of firing of the valve V3, the current IR will flow through the capacitor SCR a correspondingly longer time and the capacitor voltage UCR will have an addition dUCR corresponding to the added current-time area. If the commutating voltages during a stationary condition are designated UKVSm,n, the commutating voltage voltage will thus in this case be UKV1,3=UKVS1,3+dUCR. Assuming a constantly ordered control angle, the control system for the equidistant control, compared with stationary conditions, will delay the time of firing of the valve V4 by an amount equal to the transient delay of the time of firing of the valve V3. This means that the valve V2 will have its conduction interval extended just as much as the valve V1. With the polarities described in FIG. 2, the capacitor voltage UCT will have an addition dUCT=−dUCR. An analysis of the commutating voltages over a whole fundamental-tone period shows that these voltages will describe a fundamental-tone oscillation with the peak value 2dUCR, which results in a corresponding fundamental tone oscillation in the direct voltage Udb of the bridge. Also the commutating margins will vary according to the same pattern, where in this example the valve V2 will have the greatest and the valve V5 the smallest commutating margin.

Figure 3:
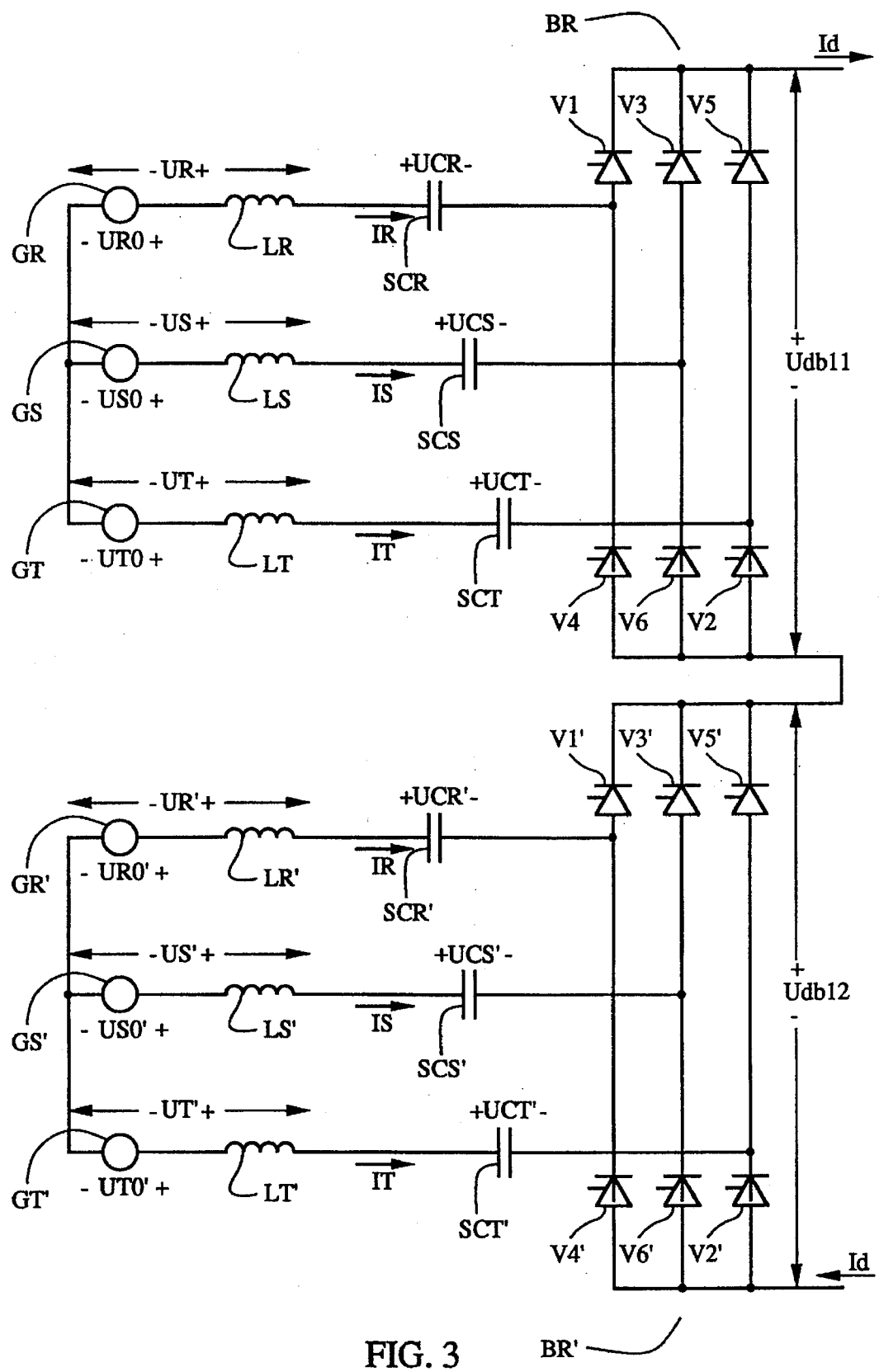
FIG. 3 shows two series-connected converter bridges according to FIG. 2.

FIG. 3 shows two 6-pulse bridges BR and BR', series-connected on their direct-voltage sides, of the kind described with reference to FIG. 2. The voltages UR0, US0 and UT0 are each phase-shifted 30° relative to the corresponding voltages UR0', US0' and UT0', respectively. For the rectifier, the voltage across the direct-voltage terminal of the respective bridge is designated Udb11 and Udb12 and for the inverter Udb21 and Udb22. For the direct voltage Ud1 of the rectifier, thus, Ud1=Udb11+Udb12, and for the direct voltage of the inverter, Ud2=Udb21+Udb22.

Each converter is equipped with a piece of control equipment CE1, CE2, respectively (FIG. 1). Each of the pieces of control equipment comprises a control angle unit CAC for forming an ordered value of the control angle α, which control angle unit will be described in greater detail below, units CFC designed known manner for determining the firing moment of the respective valve in dependence on the ordered value of the control angle α, and CPG for generating control pulses CP1 and CP2, respectively, to the valves included in the converters at the firing moment. From a power control unit POC, the control angle unit CAC is supplied with a reference value for active power, which reference value is formed in a known manner. The control angle unit may also be supplied with other reference values from superordinate control systems, not shown in the figure, for example for control of reactive power exchange with the alternating-voltage networks.

The direct voltage Ud1 of the rectifier and the direct voltage Ud2 of the inverter are measured by means of voltage-measuring devices UM1, UM2, respectively, which deliver the measured values UD1 and UD2, respectively. In addition, the voltage measuring devices are adapted to deliver measured values UDB11, UDB12 of the bridge voltages Udb11 and Udb12 and measured values UDB21, UDB22, respectively, of the bridge voltages Udb21 and Udb22 of the inverter. The current Id through the d.c. connection is measured by means of current measuring devices IM1, IM2, respectively, which deliver the measured values ID1 and ID2, respectively. The voltages Un1 and Un2, respectively, of the alternating-voltage networks are measured by means of voltage-measuring devices UMN1 and UMN2, respectively, which deliver the measured values UN1 and UN2, respectively. The measured values UN1 and UN2 also contain information about the fundamental frequency $f_{o1}$ and $f_{o2}$ of the respective alternating-voltage network.

The pieces of control equipment of the converters are supplied with the above-mentioned measured values of the operating parameters of the installation, that is, the control equipment of the rectifier is supplied with measured values for the voltage of the alternating-voltage network, for direct and bridge voltages of the rectifier, and the direct current in the dc connection, and the control equipment of the inverter is supplied with corresponding measured values relating to the inverter. In addition, the pieces of control equipment are supplied (in a manner not shown in the drawings but known) with input signals representing the fundamental frequency of the respective alternating-voltage network and information about the position of the tap-changers and a power-direction signal RECT/INV, the latter signal indicating rectifier operation and inverter operation, respectively, and being determined in dependence on the power direction requested by the operator of the installation.

In dependence on measured values and input signals supplied to the pieces of control equipment, the pieces of control equipment of the rectifier and the inverter generate control pulses CP1 and CP2, respectively, for the valves of the converters and supply these to the respective valve.

The two pieces of control equipment communicate with each other, known manner, via a telecommunication link TL for two-way transmission of information about the operating parameters of the converters.

The respective control equipment may also comprise a tap-changer control unit, not shown in the figure but designed in a known manner, for generation of INCREASE/DECREASE impulses for the tap-changers, which impulses are supplied to the operating equipment of the tap-changers.

FIG. 4 shows parts of a piece of control equipment for the converter stations according to FIG. 1, in one embodiment of the invention. The pieces of control equipment are usually designed identically for both rectifiers and inverters, and therefore in FIG. 4 and the subsequent FIGS. 5–7 and 9–11, indices 1 and 2, respectively, for indicating quantities relating to a rectifier and an inverter are not indicated.

The power control unit POC comprises a calculating member IOCAL for calculating a current order IO as the quotient between a power order PO for transferred active power in the d.c. connection and a measured value UD of the direct voltage Ud in the rectifier. The current order is supplied to a limiting member 1 for limiting the current order in dependence on the measured value UD of the direct voltage Ud, supplied to the above-mentioned limiting member. The output signal IOL from the limiting member 1 is thereafter supplied to a current controller CC comprised in the control angle unit CAC as reference value for this controller. The current controller is also supplied with a signal SF, which is formed according to a further development of the invention and which will be explained in greater detail in the following.

The output signal AO of the current controller is limited to its minimum and its maximum value in a limiting member 2 by means of limiting signals AMAXL and AMINL, respectively, capable of being influenced. The output signal AOL from the limiting member 2, which thus is an ordered value of the control angle α, is supplied to the unit CFC for determining the firing moment of the respective valve.

At each of the firing moments for a valve, the unit CFC also generates a synchronization signal SYNC, the function of which will be described in more detail below.

FIG. 5 shows an embodiment of the current controller CC. A summator 3 forms as output signal the difference of the reference value IOL for the direct current Id and the measured value ID of this current. The difference is supplied to a proportional-amplifying member 4 with a gain GP and to a summator 5. The summator 5 is also supplied with a preselected current margin IOM between the rectifier and the inverter, and forms as output signal the difference of the current margin and the output signal from the first summator 3. The output signal from the summator 5 is supplied to an integrating member 6 with the integration time constant 1/GI. The integrating member comprises a limiting member 7 which limits the output signal from the integrating member to its maximum and to its minimum value in dependence on a limiting signal AMAXLI, capable of being influenced, and the limiting signal AMINL, respectively. A summator 8 is supplied with the signal SF and with the output signals from the proportional-amplifying member 4 and from the integrating member, limited by the limiting member 7. The output signal from the summator 8 constitutes the output signal AO of the current controller and forms the sum of the signal SF and the output signal from the integrating member, reduced by the output signal from the proportional-amplifying member.

The current orders and the current margins for the rectifier and the inverter are synchronized via the telecommunication link TL, but the coordination may also be performed in other conventional ways.

The current margin IOM is usually equal to zero for the rectifier and for the inverter it is set at a value different from zero and with such a sign that the control equipment of the inverter strives to reduce the direct current controlled by the rectifier. During stationary inverter operation, the input signal to the integrating member 6 thus consists of the current margin, which means that its output signal will assume its maximum value limited by the limiting signal AMAXLI. The output signal from the proportional-amplifying member 4 is, in equilibrium state, equal to zero or near zero and therefore, if the signal SF is temporarily disregarded, the value of the control angle α ordered by the inverter is determined by the above limiting signal.

Figure 6:
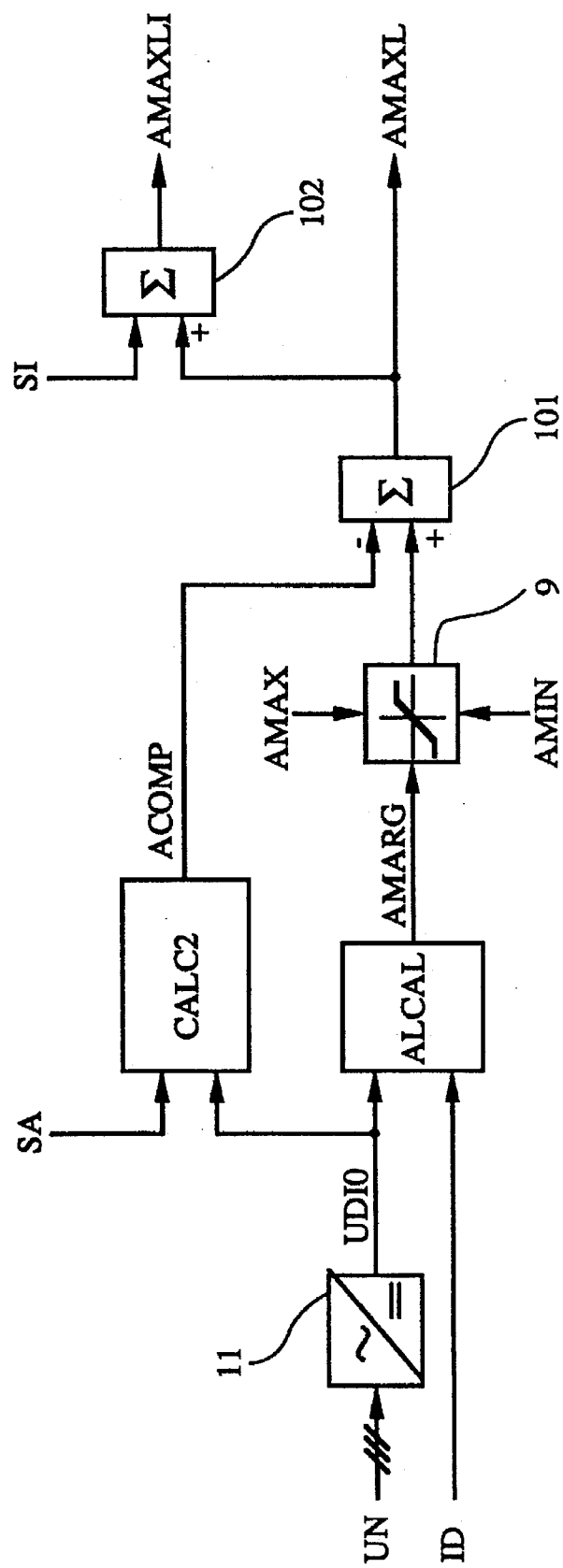
FIG. 6 shows in the form of a block diagram a limitation of the maximum control angle in inverter operation for control equipment according to FIG. 4 in one embodiment of the invention.

FIG. 6 shows how the limiting signals AMAXL and AMAXLI are formed in an advantageous embodiment of the invention. A control unit ALCAL forms in a known manner, for example in dependence on parameters such as the direct current Id and/or the ideal no-load direct voltage Udi0, an output signals AMARG as a value of the control angle which, at balanced capacitor voltages, is assumed to give a commutating margin γm with a satisfactory safety with respect to commutating errors. The output signal AMARG is supplied to and limited in a limiting member 9 to its maximum and its minimum value by means of limiting signals AMAX and AMIN, respectively. The output signal from the limiting member 9 is supplied to a summator 101, which is also supplied with a compensating signal ACOMP which is formed according to the invention and which will be described in more detail below. The output signal from the summator 10, which is the difference of the output signal from the limiting member 9 and the compensating signal ACOMP, constitutes the limiting signal AMAXL, which is supplied to the limiting member 2 of the control-angle unit CAC. The signal AMAXL is supplied to a summator 102, which is also supplied with a signal SI which is formed according to a further development of the invention and which will be described in more detail below. The output signal from the summator 102, which is the difference of the limiting signal AMAXL and the signal SI, constitutes the limiting signal AMAXLI, which is supplied to the limiting member 7 of the current controller.

The voltage value UDI0 is formed in a known manner as the output signal from a rectifier 11 (FIG. 6), which rectifies the measured value UN of the voltage Un of the alternating-voltage network, taking into consideration the current transformer ratio.

The limiting signal AMINL is formed in a known manner for the respective rectifier and inverter.

Figure 7:
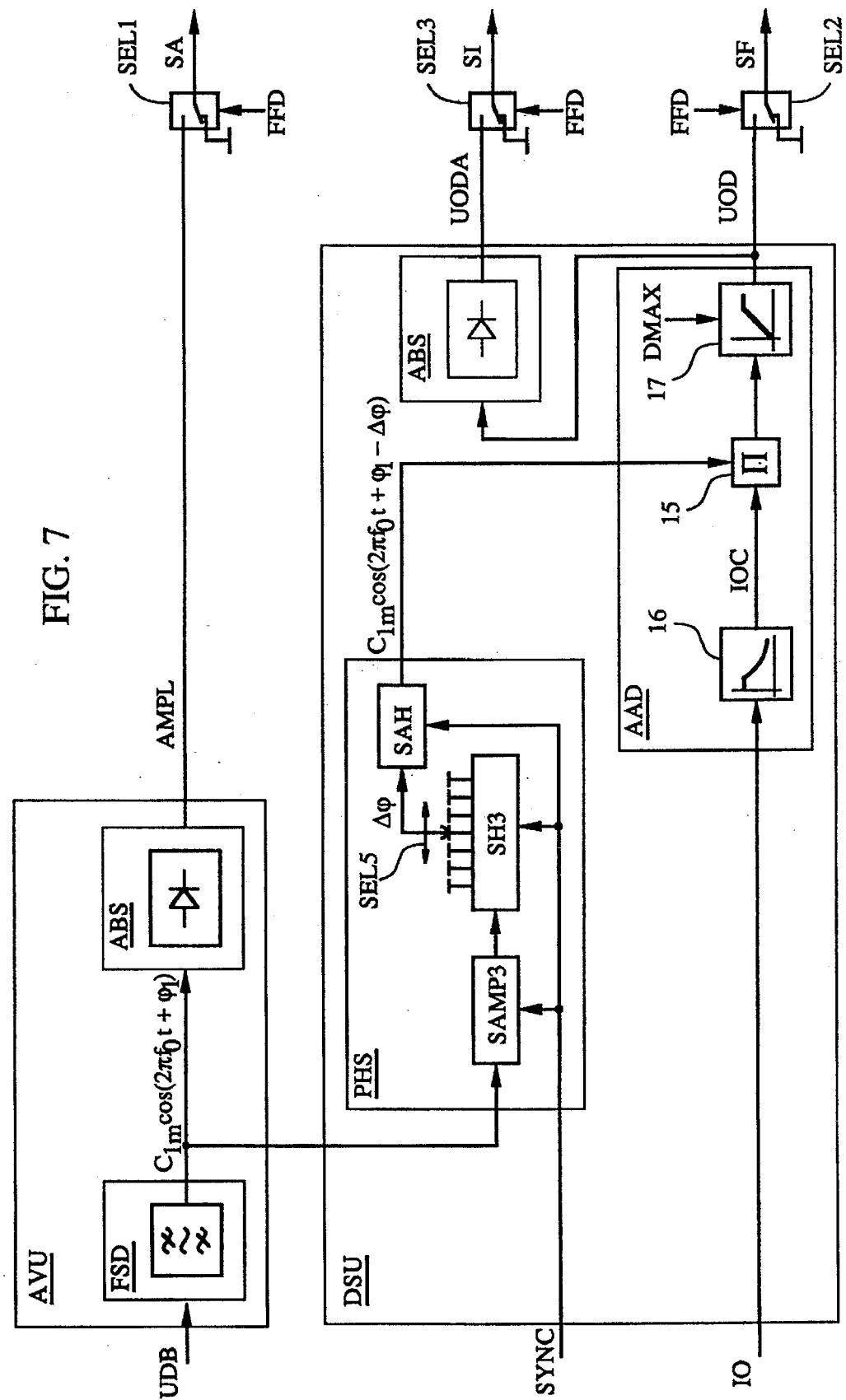
FIG. 7 shows in the form of a block diagram the formation of an amplitude signal and a damping signal in one embodiment of the invention.

FIG. 7 shows one embodiment of the invention. An amplitude-value forming unit AVU, comprising a frequency-separating member FSD and an absolute-value forming member ABS, is supplied with a measured value UDB of the direct voltage Udb of a 6-pulse pulse bridge and forms, for a sensed component of the fundamental frequency in the direct voltage, for example caused by the above-described unbalance in capacitor voltages, as output signal an amplitude signal AMPL.

The measured value UDB here designates one of the above-mentioned measured values UDB11, UDB12 of the bridge voltages Udb11 and Udb12 of the rectifier and the measured values UDB21, UDB22 of the bridge voltages Udb21 and Udb22 of the inverter.

If the bridge voltage is assumed to be $$Udb(t) = A_0 + \sum_{k=1}^{\infty} C_k * \cos(k*2\pi f_0 t + \psi_k),$$

where k is a natural number 1, 2, 3, ..., $A_0$ designates the direct-voltage component of the bridge voltage and $C_k$ the amplitude of the k'th harmonic tone thereof. $C_1$ thus designates the amplitude of the component of fundamental frequency in the bridge voltage and $\phi_1$ its phase angle relative to the firing moment of the valves.

Figure 8:
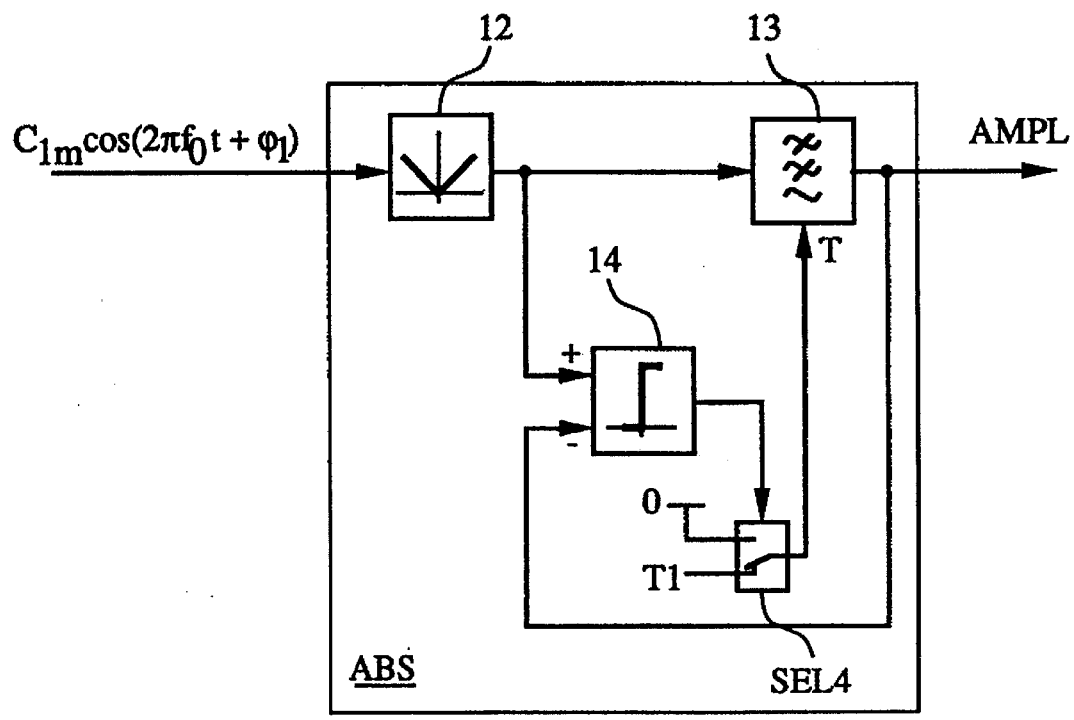
FIG. 8 shows in the form of a detailed block diagram one way of forming an amplitude signal in an embodiment of the invention according to FIG. 7.

The frequency-separating member FSD is adapted to separate, from the supplied measured value UDB, the component of the fundamental frequency and be shown as a bandpass filter. It may consist of a bandpass filter designed in some known manner, tuned to the fundamental frequency $f_0$ of the alternating-voltage network. Its output signal, designated $C_{1m}*\cos(2\pi f_0 t + \phi 1)$, constitutes a measured value of the above fundamental component and is supplied to the absolute-value forming member ABS. The absolute-value forming member is adapted to form the amplitude signal AMPL in dependence on the amplitude $C_{1m}$ such that the amplitude signal AMPL corresponds to the amplitude $C_1$ of the component of the fundamental frequency in the bridge voltage. FIG. 8 shows an embodiment of the absolute-value forming member, comprising a rectifier 12, which is supplied with the signal $C_{1m}*\cos(2\pi f_0 t + 1)$, and a low-pass filter 13 with a time constant T capable of being influenced, which is supplied with the output signal from the rectifier and forms as output signal the amplitude signal AMPL. A comparing member 14 is supplied with the output signal from the rectifier 12 and the amplitude signal AMPL and controls, in dependence on the comparison, a selector SEL4. Via the selector the time constant of the low-pass filter is set a zero when the output signal from the rectifier is greater than the amplitude signal and otherwise at a value T1. The value T1 may advantageously be selected to correspond to a period of the fundamental frequency.

The amplitude signal AMPL is supplied to a selector SEL1 (FIG. 7), controlled by a detector signal FFD. According to a preselected criterion, the detector signal indicates the occurrence of a component of the fundamental frequency in the bridge voltage and embodiments the formation thereof will be described in more detail below. The occurrence of such a component is, as described above, connected with variations in commutating margin and the object of the invention is now to achieve, in dependence on the amplitude signal, a compensation of these variations so as to obtain a commutating margin which is not lower than the value aimed at.

For the main circuits of the series-compensated converter station in inverter operation, current/voltage equations may be set up in a known manner with the control angle $\alpha$ (related to the voltage of the alternating-voltage network), the direct current Id1, the ideal no-load direct voltage Udi02 and the commutating margin $\gamma_m$ of the valve as variables. If in these equations a constant preselected value $\gamma_p$ of the commutating margin of the valve is assumed, the control angle $\alpha$ can be calculated, suitably iteratively, with the direct current and the ideal no-load direct voltage as variables. In formal terms, this can be expressed such that the control angle is a function G of the direct current, the ideal no-load direct voltage and the commutating margin, $\alpha = G(Id2, Udi02, \gamma_p)$. In this connection, the voltages UCR, UCS, UCT are implicitly included, which voltages, as mentioned above, are functions of the direct current.

However, in case of an unbalance in the capacitor voltages, as mentioned above, variations in the commutating margin of the valves will arise, and these variations are dependent on the additions dUCR, dUCS, dUCT to the balanced capacitor voltages. If these additions are generally designated $\Delta Uc$, for that valve whose commutating voltage is subjected to the greatest reduction (in the above example the valve V5), a main circuit relationship may be set up with a control-angle addition $\Delta \alpha$, the direct current Id2, the ideal no-load direct voltage Udi02, the commutating margin $\gamma_m$ of the valve, and the unbalance voltage $\Delta Uc$ as variables. If in these equations a constant preselected value $\gamma_p$ of the commutating margin is assumed, the control-angle addition $\Delta \alpha$ may be calculated, suitably iteratively, with the direct current, the ideal no-load direct voltage, and the unbalance voltage of the capacitors as variables. In formal terms, this may be expressed such that the control-angle addition is a function F0 of the direct current, the ideal no-load direct voltage, the commutating margin, and the unbalance voltage, $\Delta \alpha = F0(Id2, Udi02, \gamma_p, \Delta Uc)$. The control-angle addition $\Delta a$ is thus the addition which, at the unbalance voltage $\Delta Uc$, must be added to the control angle which is formed in dependence on the signal AMARG during operation with balanced capacitor voltages in order for a commutating margin equal to the preselected value $\gamma_p$ to be maintained on the valve which, because of the unbalance volrage, is given the smallest commutating margin. As will be clear from the above, the amplitude signal AMPL corresponds to the amplitude $C_1$ of the component of fundamental frequency in the bridge voltage and this amplitude, in turn, corresponds to the unbalance voltage $\Delta Uc$.

When the detector signal FFD occurs, the output signal SA thereof is set via the selector at a value equal to the amplitude signal AMPL, otherwise it assumes the value zero. The output signal SA from the selector is supplied to a calculating unit CALC2 (FIG. 6). The calculating unit comprises calculating members, adapted to continuously calculate a compensating signal ACOMP corresponding to a control-angle addition according to the relationship H0, according to which the control-angle addition is the function F0 mentioned above. The compensating signal calculated and formed by the calculating unit is supplied to the summator 101 and is subtracted therein from that value, formed by the control unit ALCAL and limited by the limiting member 9, of the control angle which under otherwise similar conditions is valid for balanced capacitor voltages. In this way, thus, the control angle, which is formed in dependence on the limiting signal AMAXL (FIG. 4), is reduced by the value $\Delta \alpha$, which in turn means that also the valve which, because of the unbalance voltage is given the smallest commutating margin, is given a commutating margin which is not lower than the preselected value $\gamma_p$.

The function F0 is relatively complicated and a study of representative plants has shown that a satisfactory compensation for the variations in the commutating margin may be achieved even when the compensating signal ACOMP is formed as a calculated expression according to a relationship which approximately imitates the relationship F0 described above. In this way, simplified functions for the dependence of the control-angle addition on direct current, ideal no-load direct voltage, and unbalance voltage may be assumed, which means that the calculating members comprised in the calculating unit CALC2 may be designed simpler and perform the calculation more rapidly. It has proved to be advantageous to continuously supply the calculating unit with a voltage value UDI0 of the ideal no-load direct voltage of the converter bridge and to adapt the calculating unit to calculate, in dependence on supplied values, a compensating signal ACOMP corresponding to a control-angle addition according to a relationship H1 of the form $$H1 = K1 \left( \frac{UDI0}{UDI0 - SA} - 1 \right)$$

where K1 is an amplification factor.

FIG. 7 further shows an advantageous improvement of the invention, according to which a damping signal UOD is formed, which is supplied to the current controller CC for faster damping of the fundamental component in the voltage of the converter bridge and the unbalance voltages in the series capacitors. A damping signal-forming unit DSU is supplied with the measured value $C_{1m}*\cos(2\pi f_0 t+\phi_1)$ of the component of the fundamental frequency in the voltage of the bridge, the above-mentioned signal of the synchronization signal SYNC, and the value IO of the current order of the d.c. transmission. The unit DSU comprises a phase-shifting member PHS, an amplitude-adapting member AAD, and an absolute-value forming member ABS of the same kind as that which is included in the amplitude-value forming unit. The phase-shifting member comprises a sampling circuit SAMP3, a shift register SH3 and a holding circuit SAH, controlled by the synchronization signal. The shift register has a series input and a parallel output, which output may be connected to optional positions in the shift register by means of an adjustable selector SEL5, symbolized in the figure by a two-way arrow. The sampling circuit forms a sampled value of the measured value $C_{1m}*\cos(2\pi f_0 t+\phi_1)$ upon each synchronization signal, and these sampled values are supplied to the shift register. At that position in the shift register where the signal is taken out, its input signal has become delayed corresponding to a phase addition $\Delta\phi$. The output signal from the shift register is supplied to a holding circuit, the output signal of which consists of the measured value $C_{1m}*\cos(2\pi f_0 t+\phi_1)$ delayed by the phase addition $\Delta\phi$, that is, $C_{1m}*\cos(2\pi f_0 t+\phi_1-\Delta\phi)$.

A detailed analysis of the voltage conditions in the converter bridge in case of unbalance in the voltages of the capacitors shows that optimum damping is achieved when the resultant control-angle change which is achieved in dependence on the damping signal is phase-shifted 120° relative to the fundamental component in the bridge voltage. The phase addition $\Delta\phi$ in the shift register is therefore ideally to correspond to 120°, but delays in the signal processing and the influence on the firing moment of the valves mean that the phase addition should be selected somewhat lower than 120°. For example, therefore, the shift register may be designed so as to permit a setting of the phase delay equal to 120°±n*12°, where n is a number 0, 1, 2, 3, . . . .

The amplitude-adapted member AAD comprises a multiplier 15, a function-forming member 16, and a limiting member 17. The output signal $C_{1m}*\cos(2\pi f_0 t+\phi_1-\Delta\phi)$ from the phase-shifting member PHS is supplied to the multiplier for multiplication by the output signal IOC from the function-forming member 16. The output signal IOC is formed in dependence on a value of the current order IO, supplied to the function-forming member, in such a way that the output signal IOC decreases with increasing current order. The output signal from the multiplier is supplied to the limiting member 17 which limits the product IOC*$C_{1m}$*cos$(2\pi f_0 t+\phi_1-\Delta\phi)$ so as not to exceed a value DMAX. The output signal from the limiting member constitutes the damping signal UOD. The multiplication of the signal $C_{1m}*\cos(2\pi f_0 t+\phi_1-\Delta\phi)$ by IOC brings about an amplification adaptation of the intervention from the damping signal, taking into consideration that, at large currents, a smaller control-angle change is required to achieve a certain change of the capacitor voltage.

The damping signal UOD thus consists of a signal of the form UOD=D*$\cos(2\pi f_0 t+\phi_a)$, where its amplitude D is formed in dependence on the product of the output signal IOC from the function-forming member 16 and the amplitude $C_1$ of the component of the fundamental frequency in the bridge voltage and its phase angle $\phi_a$ consists of the difference $(\phi_1-\Delta\phi)$ of the phase angle $\phi_1$ for the component of fundamental frequency in the bridge voltage and the phase addition $\Delta\phi$.

The value of DMAX may advantageously be chosen to correspond to an angle of about 5°.

For the damping signal to be able to provide both positive and negative additions to the ordered value AOL of the control angle $\alpha$, the output signal from the integrating member 6 is limited to a value AMAXLI which in magnitude is smaller than the limiting value AMAXL which is supplied to the limiting member 2 (FIG. 5) of the control-angle unit CAC. This is achieved by supplying the damping signal to the absolute-value forming member comprised in the damping-signal forming unit, the output signal UODA of the absolute-value forming member being formed in dependence on the amplitude D for the damping signal.

The output signal UODA is supplied to a selector SEL3, which is controlled by the detector signal FFD. When the detector signal is present, the output signal SI of the selector assumes a value equal to the output signal UODA; otherwise, it assumes the value zero. The output signal SI from the selector is supplied to the summator 102 (FIG. 6), the output signal of which constitutes the limiting signal AMAXLI formed as the difference of the limiting signal AMAXL and the output signal SI.

Figure 9:
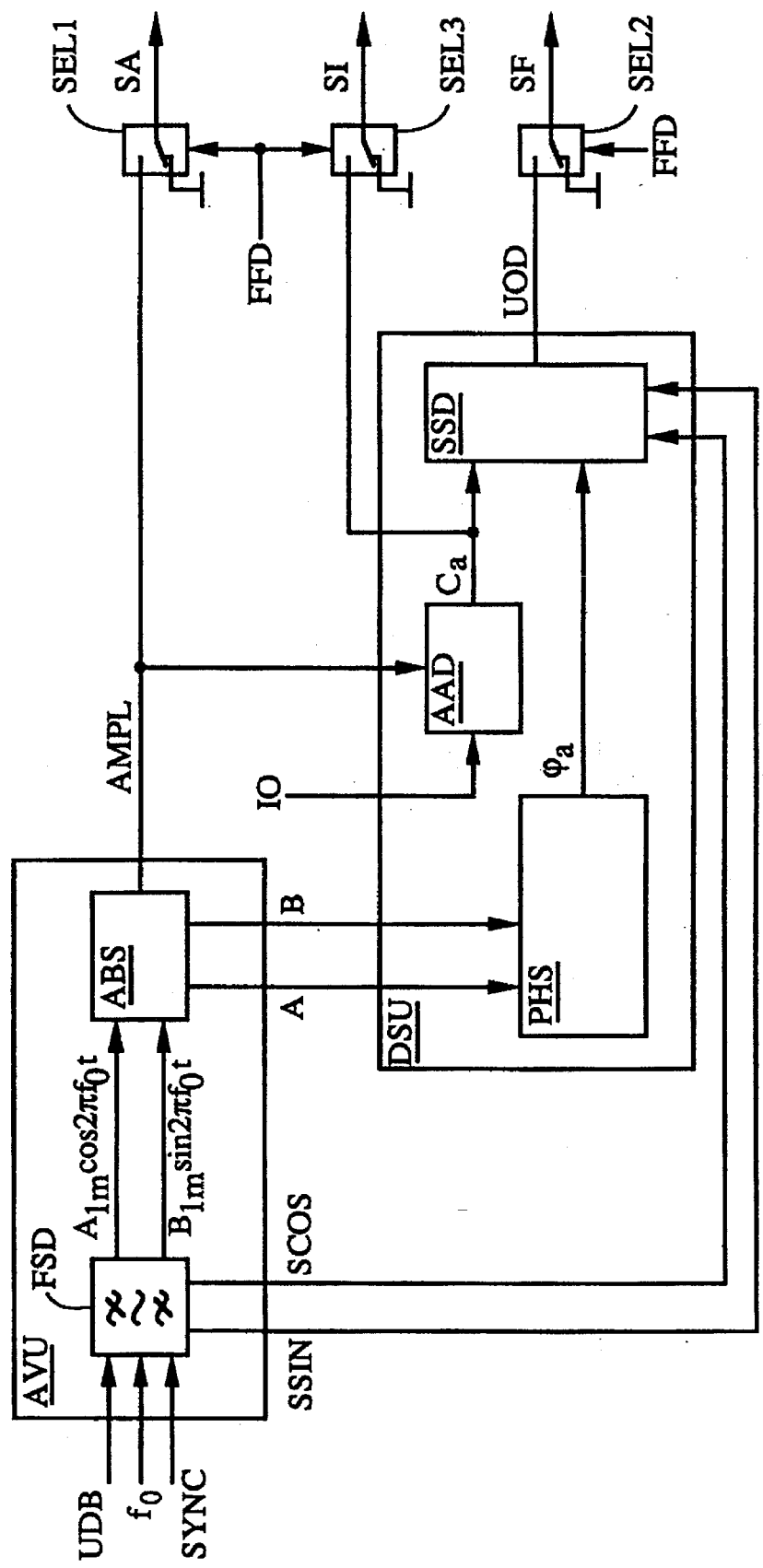
FIG. 9 shows in the form of a block diagram the formation of an amplitude signal and a damping signal in another embodiment of the invention.

FIG. 9 shows a general block diagram for another embodiment of the invention.

Figure 10:
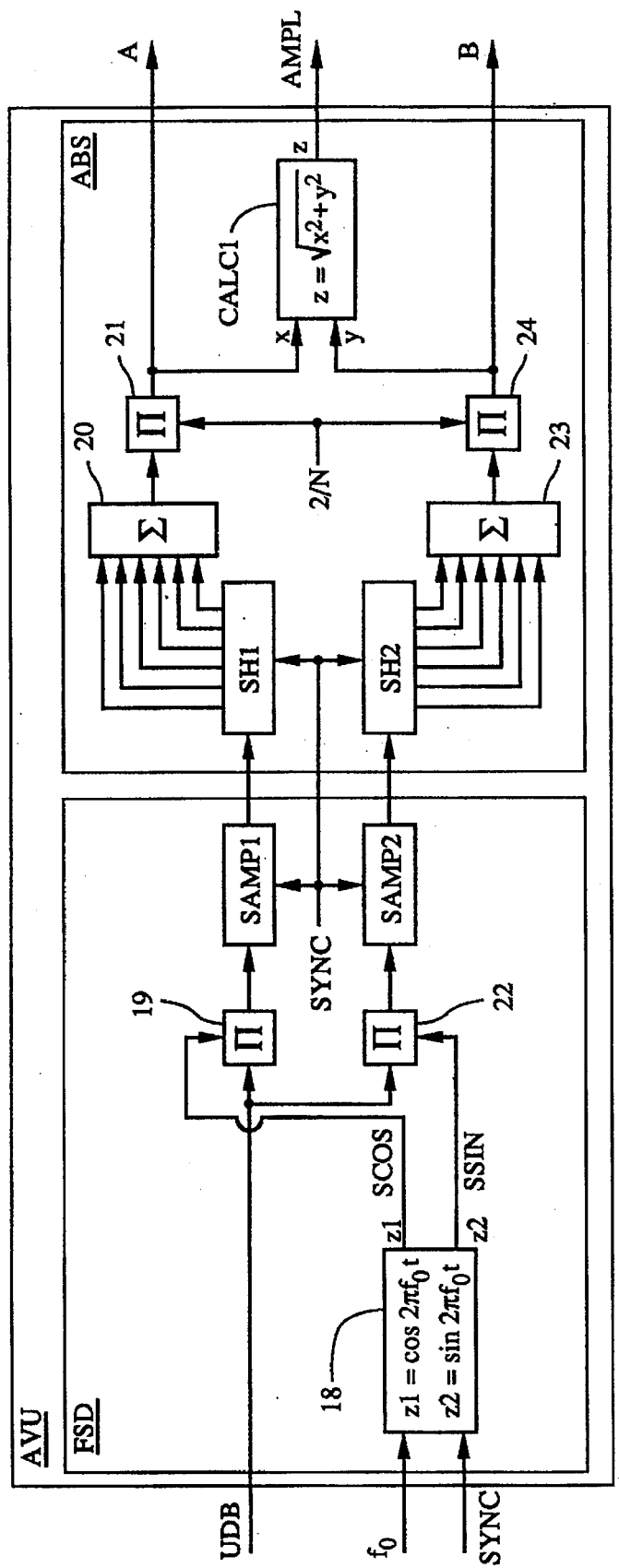
FIG. 10 shows in the form of a detailed block diagram one way of forming an amplitude signal in an embodiment of the invention according to FIG. 9.
Figure 11:
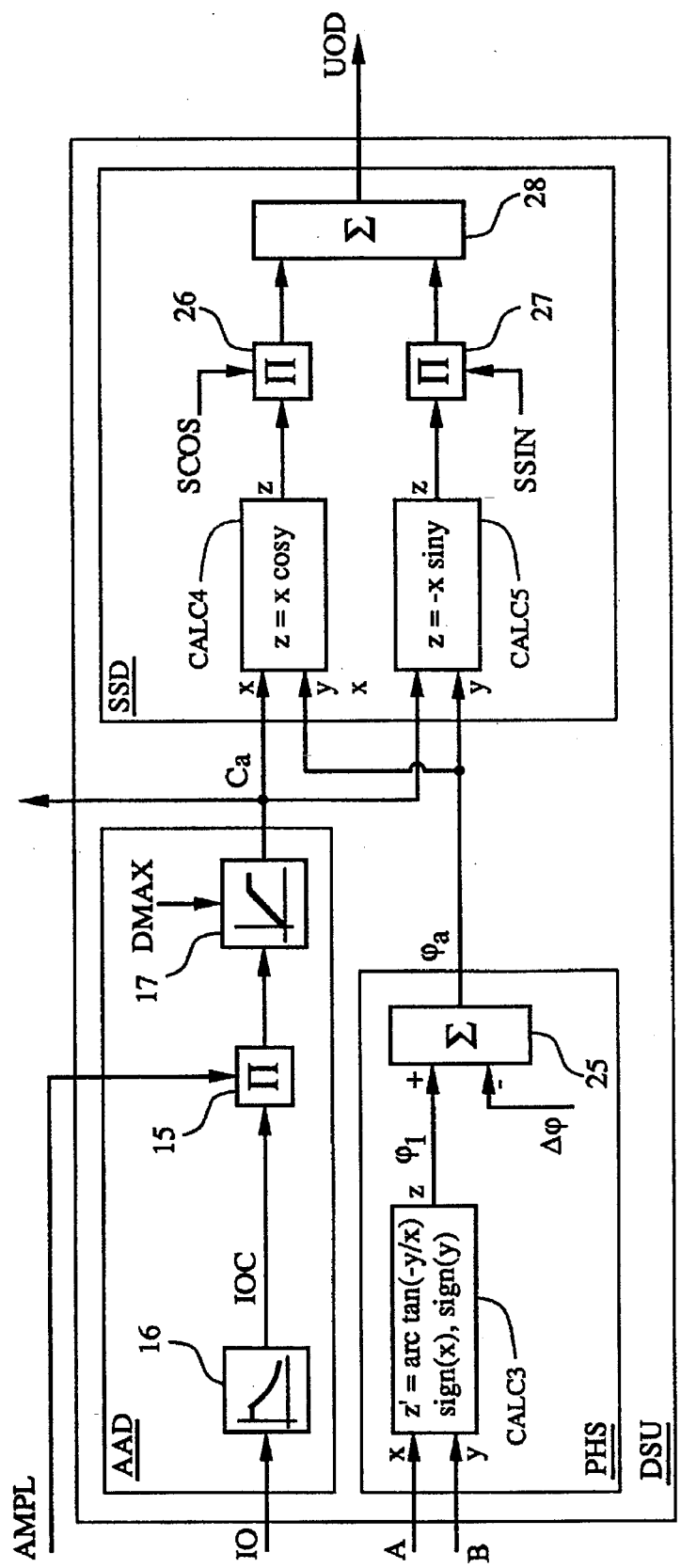
FIG. 11 shows in the form of a detailed block diagram one way of forming a damping signal in an embodiment of the invention according to FIG. 9.

The amplitude-value forming unit, which is supplied with the measured value UDB of the component of the fundamental frequency in the bridge voltage, the synchronization signal SYNC and a measured value of the fundamental frequency $f_0$ of the respective alternating-voltage network, is shown in a more detailed block diagram in FIG. 10. For a sensed component of fundamental frequency in the direct voltage, for example caused by the above-described unbalance in capacitor voltages, the amplitude-value forming unit forms the amplitude signal AMPL and a cosine amplitude signal A and a sine amplitude signal B.

The amplitude-value forming unit comprises an oscillator 18 which, in dependence on the supplied measured value of the fundamental frequency $f_0$ of the respective alternating-voltage network and on the synchronization signal SYNC for the converter which is connected to this alternating-voltage network, generates a cosine signal SCOS=$\cos(2\pi f_0 t)$ and a sine signal SSIN=$\sin(2\pi f_0 t)$, where 't' stands for the time, such that the phase positions for sine and cosine are mutually identical and their phase shifts are related to the synchronization signal SYNC. In this embodiment, it is assumed for the sake of simplicity that the phase shift related to the synchronization signal SYNC is zero.

Further, the amplitude-value forming unit comprises a multiplier 19, a sampling circuit SAMP1, controlled by the synchronization signal SYNC, a shift register SH1 with a series input and a parallel output, a summator 20 and a multiplier 21.

The measured value UDB is supplied to the multiplier 19, in which it is multipliedby the cosine signal SCOS. The output signal from the multiplier is supplied to the sampling circuit, which forms a sampling value of the product UDB*SCOS at each synchronization signal. The sampling value is supplied to the shift register in which are stored the latest sampling values to a number corresponding to at least one period of the signal SCOS. If the number of sampling values which may be stored in the shift register are designated N, it is advantageous in a 6-pulse bridge to choose N to be 6 or to be an integer multiple of 6. The N latest sampling values, corresponding to one or several periods of the signal SCOS, are summed upon each synchronization signal in the summator 20, the output signal of which in the multiplier 21 is normalized by multiplication by a number 2/N.

If the bridge voltage is set at $$Udb(t) = A_0 + \sum_{k=1}^{\infty} A_k * \cos(k*2\pi f_0 t) + \sum_{k=1}^{\infty} B_k * \sin(k*2\pi f_0 t),$$

where i is a natural number 1, 2, 3 ..., the output signal from the multiplier 21 is a cosine amplitude signal A which is a measure of the amplitude $A_1$ of the cosine component of the fundamental frequency in the bridge voltage.

The amplitude-value forming unit further comprises a multiplier 22, a sampling circuit SAMP2, a shift register SH2, a summator 23 and a multiplier 24.

The measured value UDB of the bridge voltage is also supplied to the multiplier 22, in which it is multiplied by the sine signal SSIN. The output signal from the multiplier 22 is then processed in a manner analogous to that described above in the sampling circuit SAMP2, the shift register SH2, the summator 23 and the multiplier 24. The output signal from the multiplier 24 is a sine amplitude signal B which is a measure of the amplitude $B_1$ of the sine component of the fundamental frequency in the bridge voltage.

The cosine amplitude signal A and the sine amplitude signal B are supplied to a calculating member CALC1, which in a known manner calculates the square root from the sum of the squares of A and B.

It is realized that if the bridge voltage is assumed to be $$Udb(t) = A_0 + \sum_{k=1}^{\infty} C_k * \cos(k*2\pi f_0 t + \psi_k),$$

the signal calculated by the calculating member CALC1 is a measure of the amplitude $C_1$ of the fundamental component in the bridge voltage and forms the amplitude signal AMPL. Also in this embodiment of the invention, the amplitude signal is supplied to the selector SEL1, which for the sake of clarity is also shown in FIG. 9. The compensating signal ACOMP is then formed in the manner described above.

FIG. 9 further shows another embodiment of the further development of the invention according to which a damping signal UOD is formed. The damping-signal forming unit DSU comprises a phase-shifting member PHS, an amplitude-adapting member AAD, and a signal-synthesizing member SSD, which members are shown in more detail in FIG. 11. The amplitude-adapting member is of the same kind as that described above with reference to FIG. 7, but in this embodiment the multiplier 15 is supplied with the amplitude signal AMPL and the unit delivers as output signal a compensated amplitude signal designated $C_a$.

The phase-shifting member PHS comprises a phase-angle forming member CALC3 and a summator 25. The cosine amplitude signal A and the sine amplitude signal B may assume both positive and negative values and are to be regarded as two components, perpendicular to each other, of a vector corresponding to the amplitude signal AMPL, which in turn is a measure of the amplitude $C_1$ of the fundamental component in the bridge voltage. The signals A and B are supplied to the phase-angle forming member, which in a known manner is adapted to form a value which is a measure of the phase angle $\phi_1$ for this fundamental component. This is marked in the figure by the phase-angle forming member comprising calculating members adapted to calculate a phase angle $\phi'$ according to the expression $\phi' = \arctan(-B/A)$ and by sensing the sign of the cosine amplitude signal A and the sine amplitude signal B, respectively, in the figure marked by sign(A) and sign(B), respectively, to the value of the principal value of the arctan function, which value by definition lies between $-90°$ and $+90°$, correctly taking into consideration the signs of the signals A and B and, where applicable, adding an angle $180°$.

The value of the phase angle $\phi_1$, formed by the phase-angle forming member, and a phase addition $\Delta\phi$ are supplied to the summator 25 which as output signal forms a compensated phase angle $\phi_a$ as the difference $(\phi_1 - \Delta\phi)$ of the phase angle $\phi_1$ for the component of the fundamental frequency in the bridge voltage and the phase addition $\Delta\phi$. The phase addition $\Delta\phi$ is chosen according to the same criteria as described above with reference to FIG. 7.

The signal-synthesizing member SSD, which is supplied with the values $C_a$ and $\phi_a$ and the above-described cosine signal SCOS and the sine signal SSIN, respectively, comprises a calculating member CALC4, adapted to form as output signal an expression $C_a\cos(\phi a)$ and a calculating member CALC5, adapted to form as output signal an expression $-C_a\sin(\phi a)$. The output signal from CALC4 is multiplied by the cosine signal SCOS in a multiplier 26 and the output signal from CALC5 by the sine signal SSIN in a multiplier 27. The products thus obtained are summed in a summator 28, the output signal of which forms the damping signal UOD.

In this case, thus, the damping signal may be written as UOD=DCOS*cos($2\pi f_0 t$)+DSIN*sin($2\pi f_0 t$), where the amplitudes DCOS and DSIN are formed in dependence on the product of the output signal IOC from the function-forming member 16 and the amplitude $C_1$ of the component of fundamental frequency in the bridge voltage and of the phase addition $\Delta\phi$.

Also in this embodiment of the invention, the damping signal is supplied to the selector SEL2, which for sake of clarity is also shown in FIG. 9. In this embodiment, the limiting signal AMAXLI is formed in a manner analogous to that described above with reference to FIGS. 6 and 7, but with the difference that the selector SEL3 in this case is supplied with the compensating amplitude signal $C_a$ (FIG. 9).

Figure 12:
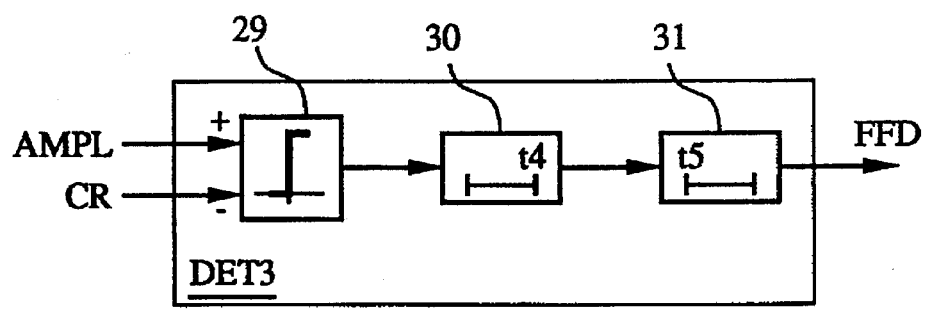
FIG. 12 shows in the form of a block diagram one way of forming a detection signal for detection of a fundamental frequency oscillation in an embodiment of the invention according to FIG. 7.

FIG. 12 shows a method of forming the detector signal FFD, which may be used to advantage in an embodiment of the invention as described with reference to FIG. 7. A detector circuit DET3 comprises a comparing member 29, a releasing-delaying delay member 30 with the time delay t4 and an operation-delaying delay member 31 with the time delay t5, which are mutually cascade-connected in the order mentioned. The comparing member is supplied with the amplitude signal AMPL and forms an output signal if the amplitude signal exceeds an optional threshold value CR. The time t5 may advantageously be chosen to be of the order of magnitude of 40 ms and the time t4 may be chosen to be of the order of magnitude of 50 ms.

Figure 13:
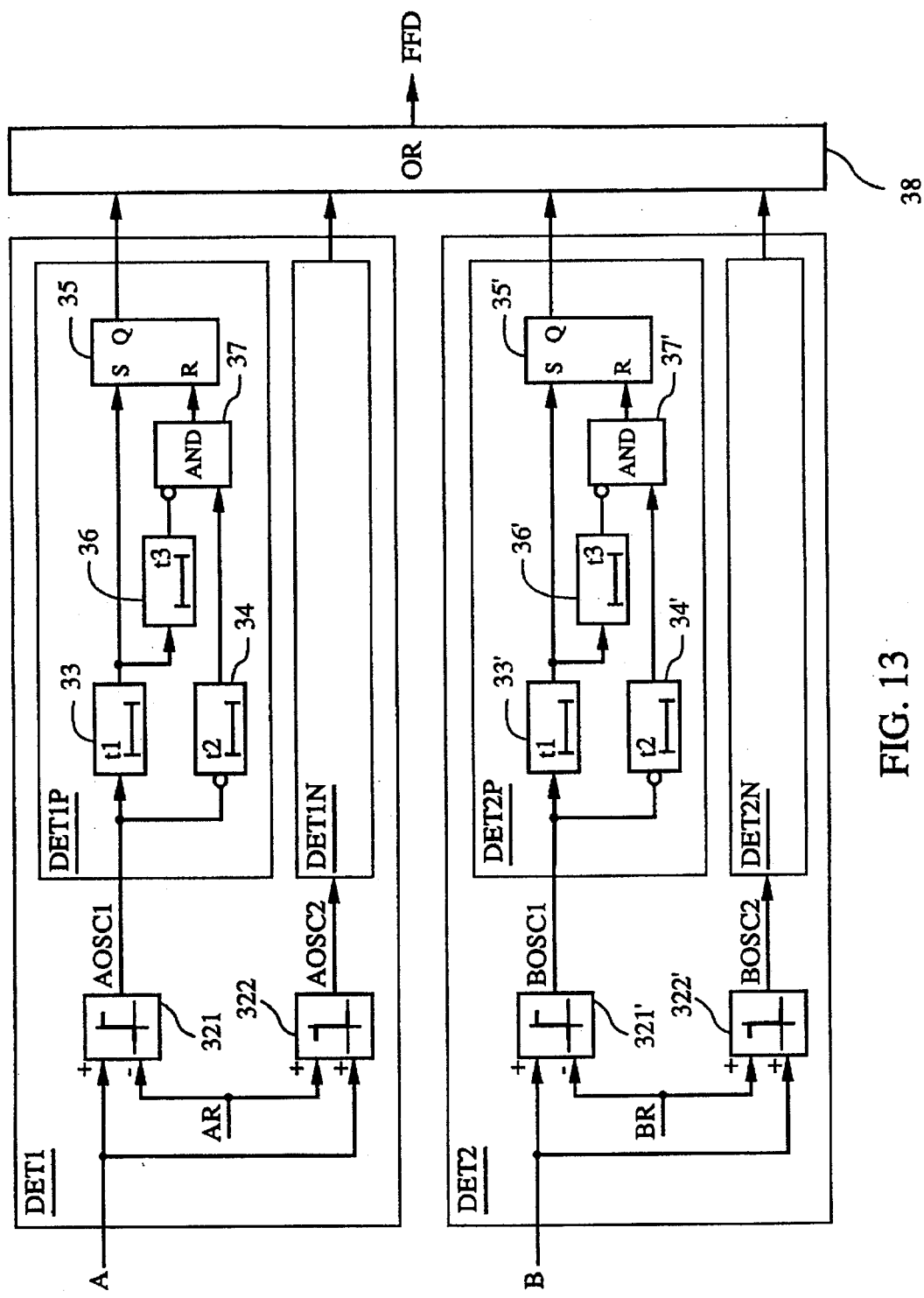
FIG. 13 shows in the form of a block diagram one way of forming a detection signal for detection of a fundamental frequency oscillation in an embodiment of the invention according to FIG. 9.

FIG. 13 shows a method of forming the detector signal FFD, which may be used to advantage in an embodiment of the invention as described with reference to FIG. 9.

If the cosine amplitude signal A and the sine amplitude signal B, considered as components of a vector corresponding to the amplitude signal AMPL, are conceived to be reproduced in a frequency plane, the resultant vector, when the measured value UDB of the bridge voltage contains a component of a frequency which deviates from the fundamental frequency, will rotate at an angular frequency which corresponds to the difference in frequency between the component in the bridge voltage and the fundamental frequency. When the bridge voltage contains a component of a frequency which is equal to the fundamental frequency, the vector will remain stationary in the vector diagram. By detecting whether the cosine amplitude signal A and the sine amplitude signal B, respectively, exceed an optional threshold value during an optional period of time, the band width of the detection, viewed in the frequency plane, will be dependent on the optional time.

The cosine amplitude signal A is supplied to a first detector circuit PET1 comprising a comparing member 321, which forms an indicating signal AOSC1 if the cosine amplitude signal A exceeds an optional threshold value AR. The indicating signal AOSC1 is supplied to a sub-detector circuit DET1P, which comprises a first delay member 33 with a time delay t1 and a second delay member 34 with a negating input and a time delay t2. The output signal from the first delay member is supplied to the S input of a bistable circuit 35 and a third delay member 36 with the time delay t3. The output signal from the second delay member is supplied to an AND circuit 37 and the output signal from the third delay member is supplied to a negative input of this AND circuit. The output signal from the AND signal is supplied to the R input of the bistable circuit for restoring its Q output. If after time t1 the indicating signal AOSC1 remains, the Q output is set at the bistable circuit. When the indicating signal AOSC1 disappears and remains gone for at least the time t2, the Q output is restored after time t3−t2. However, the Q output always remains set at least for the time t3. Advantageous choices of the respective delays have proved to be t1=40 ms, t2=10 ms, and t3=50 ms.

The cosine amplitude signal A is also supplied to a comparing member 322 which is comprised in the detector circuit DET1 and which forms an indicating signal AOSC2 if the cosine amplitude signal A is lower than the threshold value AR with a negative sign. The indicating signal AOSC2 is supplied to a detector circuit DET1N, which is built up in a manner similar to that of the sub-detector circuit DET1P.

The sine amplitude signal B is supplied to a second detector circuit DET2 with a function completely analogous to the one described above. The output signals from the respective Q outputs in the sub-detector circuits are supplied to an OR circuit 38, the output signal of which forms the detector signal FFD when the Q output from at least one of the bistable circuits of the sub-detector circuits is set.

The invention is not limited to the embodiments shown but a plurality of modifications are feasible within the scope of the inventive concept. Thus, in the event that a converter comprises more than one 6-pulse bridge, the above-mentioned compensating signal and the above-mentioned damping signal are formed for each of the converter bridges and, in a manner known to the skilled person, a selector may be adapted to select and supply to the control equipment of the converter the greatest of the above-mentioned signals.

The adaptation of the amplification to the current level in the converter, aimed at with the amplitude-adapting member AAD, may also be achieved by alternatively supplying the function-forming member 16 to a sensed and low-pass filtered value ID of the direct current Id in the converter.

The blocks shown in the block diagrams may in applicable parts be designed as a model comprising analog and/or digital means for modelling, or be completely or partially performed as calculations by means of analog and/or digital technique in hardwired circuits, or be implemented as programs in a microprocessor.

By a method and a device according to the invention, the advantages of the series compensation may be utilized without the risk of commutating errors in connection with transients in direct current and/or control angle increasing. For the inverter this is of importance since the control equipment for this normally strives to reduce the commutating margin to a minimum. For the rectifier this is of importance above all in connection with rapid control-angle changes in connection with, for example, a fault condition in the d.c. connection when the rectifier is controlled towards the highest possible negative voltage by ordering the control angle to a value near 180°. The result of these control-angle changes is, on the one hand, that the risk of unbalance of the mentioned kind increases and, on the other hand, that the rectifier will operate near its commutating margin.

During faultless operation of the converters the damping signal contributes to a faster damping of that component of the fundamental frequency in the direct voltage across the converter bridges which is caused by unbalance voltages in the series capacitors.

We claim:

1. A method for controlling a series-compensated converter station included in an installation for transmission of high-voltage direct current, said converter station comprising a converter (SR1, SR2), controlled by control equipment (CE1, CE2), with at least one 6-pulse bridge (BR), said 6-pulse bridge via series capacitors (SCR, SCS, SCT) being connected to a three-phase alternating-voltage network (N1, N2) with a fundamental frequency ($f_{o1}$, $f_{o2}$), said control equipment generating an ordered value (AOL) of a control angle ($\alpha$) for valves (V1–V6) included in the 6-pulse bridge in dependence on a limiting signal (AMAXL) capable of being controlled, said method comprising the steps of: forming an amplitude signal (AMPL) which corresponds to the amplitude (C1) for a component ($C1^{cos}(2\pi f_0 t + \phi 1)$) of the fundamental frequency in the direct voltage (Udb) of the 6-pulse bridge, continuously calculating a compensating signal (ACOMP) in dependence on a sensed voltage (Un1, Un2) at the converter station and on the amplitude signal according to a relationship (H0, H1) which at least approximately imitates a relationship according to which a control-angle addition ($\Delta\alpha$), at a commutating margin ($\tau_m$) for the valves equal to a preselected value ($\tau_p$), is a function (F0) of a current (Id1, Id2) in the converter station, said voltage in the converter station and the amplitude ($C_1$) for said component of the fundamental frequency in the direct voltage of the 6-pulse bridge, and forming the limiting signal in dependence on the compensating signal for the purpose of maintaining the commutating margin ($\tau_m$) for the valves equal to at least the preselected value ($\tau_p$) in case of unbalance between the voltages (UCR, UCS, UCT) of the series capacitors.

2. A method according to claim 1, wherein the compensating signal is calculated in dependence on a value (UDI0) of the ideal no-load direct voltage of the 6-pulse bridge and on the amplitude signal according to a relationship $$H1 = K1 \left( \frac{UD10}{UDI0 - AMPL} - 1 \right),$$

where AMPL is the amplitude signal amplitude signal and K1 is an amplification factor.

3. A method according to claim 1, wherein a damping signal (UOD) is formed in dependence on said component of fundamental frequency in the direct voltage of the 6-pulse bridge, and whereby the phase angle ($\phi_a$) of the damping signal is formed as a difference ($\phi_1-\Delta\phi$) of phase angle ($\phi_1$) for said component of the fundamental frequency and a phase addition ($\Delta\phi$), and wherein the ordered value (AOL) of the control angle for the valves included in the 6-pulse bridge is generated in dependence on the damping signal.

4. A method according to claim 3 wherein the amplitude of the damping signal is formed in dependence on a product of the amplitude ($C_1$) for said component of fundamental frequency and of a value (IOC) which is formed in dependence on a current level (IO, Id) for the converter and which decreases with increasing current level.

5. A method according to claim 1 wherein a detector signal (FFD) indicating the occurrence of said component of fundamental frequency is formed according to a predetermined criterion and wherein the limiting signal is formed in dependence on the compensating signal and on the detector signal.

6. A method according to claim 3, wherein a detector signal (FFD) indicating the occurrence of said component of fundamental frequency is formed according to a predetermined criterion and wherein the ordered value of the control angle for the valves included in the 6-pulse bridge is generated in dependence on the damping signal and on the detector signal.

7. A device for control of a series-compensated converter station included in an installation for transmission of high-voltage direct current, said converter station comprising a converter (SR1, SR2), controlled by control equipment (CE1, CE2), with at least one 6-pulse bridge (BR), said 6-pulse bridge via series capacitors (SCR, SCS, SCT) being connected to a three-phase alternating-voltage network (N1, N2) with a fundamental frequency ($f_{o1}$, $f_{o2}$), said control equipment generating an ordered value (AOL) of a control angle ($\alpha$) for valves (V1–V6) included in the 6-pulse bridge in dependence on a limiting signal (AMAXL) capable of being controlled, and voltage measuring devices (UM1, UM2) for sensing the direct voltage (Udb11, Udb12, Udb21, Udb22) of at least one of the 6-pulse bridges, wherein the control equipment comprises an amplitude-value forming unit (AVU), which is supplied with a measured value (UDM) of the direct voltage of at least one of the 6-pulse bridges and forms an amplitude signal (AMPL) corresponding to the amplitude ($C_1$) for a component of the fundamental frequency in the direct voltage (Udb) of the 6-pulse bridge, a calculating unit (CALC2), which is supplied with said amplitude signal and a value (UDI01, UDI02) of the ideal no-load direct voltage (Udi01, Udi02) and forms a compensating signal (ACOMP) in dependence on a continuously calculated value of a control-angle addition ($\Delta\phi$), calculated in dependence on a voltage (Un1, Un2) at the converter station and on the amplitude signal according to a relationship (H0, H1) which at least approximately imitates a relationship according to which the control-angle addition, at a commutating margin ($\tau_m$) for the valves equal to a preselected value ($\tau_p$), is a function (F0) of a current (Id1, Id2) in the converter station, said voltage at the converter station and the amplitude ($C_1$) for said component of fundamental frequency in the direct voltage of the 6-pulse bridge, and wherein the limiting signal is formed in dependence on the compensating signal for the purpose of maintaining the commutating margin ($\tau_m$) for the valves equal to at least the preselected value ($\tau_p$) in case of unbalance between the voltages (UCR, UCS, UCT) of the series capacitors.

8. A device according to claim 7, wherein the calculating unit calculates the control-angle addition according to a relationship (H1) of the form $$H1 = K1 \left( \frac{UD10}{UDI0 - AMPL} - 1 \right),$$

where AMPL is the amplitude signal and K1 is an amplification factor.

9. A device according to claim 7 wherein the control equipment comprises a damping-signal forming unit (DSU), which is supplied with at least one signal ($C_{1m}\cos(2\pi f_0 t + \phi 1)$, A, B, AMPL) corresponding to a component of the fundamental frequency in the direct voltage of the 6-pulse bridge and which forms a damping signal (UOD) in dependence on said at least one supplied signal, the damping-signal forming unit comprising a phase-shifting member (PHS) which forms the phase angle ($\phi a$) of the damping signal as a difference ($\phi 1-\Delta\phi$) of the phase angle ($\phi 1$) for said component of fundamental frequency and a phase addition ($\phi 1$), and wherein the ordered value (AOL) of the control angle for the valves included in the 6-pulse bridge is generated in dependence on the damping signal.

10. A device according to claim 9, wherein the damping-signal forming unit is supplied with a value of a current level (IO, Id) for the converter, and wherein the damping signal forming unit comprises an amplitude-adapting member (AAD) which forms the amplitude of the damping signal in dependence on a product of said at least one signal supplied to the damping-signal forming unit and corresponding to a component of the fundamental frequency in the direct voltage of the 6-pulse bridge and of a value (IOC) formed in dependence on said current level for the converter, said value decreasing with increasing current level.

11. A device according to claim 7 wherein the control equipment comprises a detector circuit (DET) which forms a detector signal (FFD) indicating the occurrence of said component of fundamental frequency according to a predetermined criterion, and wherein the limiting signal is formed in dependence on the compensating signal and on the detector signal.

12. A device according to claim 9 wherein the control equipment comprises a detector circuit (DET) which forms a detector signal (FFD) indicating the occurrence of said component of fundamental frequency according to a predetermined criterion, and wherein the ordered value of the control angle for the valves included in the 6-pulse bridge is generated in dependence on the damping signal and on the detector signal.

\* \* \* \* \*